(12) United States Patent
Phillips

(10) Patent No.: US 6,256,386 B1
(45) Date of Patent: Jul. 3, 2001

(54) PIVOTABLE EARPIECE ASSEMBLY

(75) Inventor: George Eric Phillips, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/166,413

(22) Filed: Oct. 5, 1998

(51) Int. Cl.[7] .................................................. H04M 1/00
(52) U.S. Cl. .......................................... 379/430; 379/433
(58) Field of Search ................................... 379/430, 433, 379/447; 455/90, 575; 381/380, 381, 379, 375, 361, 365

(56) References Cited

U.S. PATENT DOCUMENTS

| | | |
|---|---|---|
| 5,412,736 | 5/1995 | Keliiliki . |
| 5,590,417 | * 12/1996 | Rydbeck ............................ 379/433 |
| 5,724,667 | 3/1998 | Furuno . |
| 5,761,298 | 6/1998 | Davis et al. . |
| 5,943,627 | * 8/1999 | Kim et al. ........................... 379/430 |

FOREIGN PATENT DOCUMENTS

| | | |
|---|---|---|
| 19637557A1 | 4/1998 | (DE) . |
| 0 624 021 A2 | 11/1994 | (EP) . |
| 0 637 896 A2 | 2/1995 | (EP) . |
| 2317301A | 3/1998 | (GB) . |

* cited by examiner

*Primary Examiner*—Jack Chiang
(74) *Attorney, Agent, or Firm*—Coats & Bennett, PLLC

(57) ABSTRACT

An earpiece assembly includes an earbud that is pivotably mounted to a stem. In the use position, the earpiece assembly is preferably generally L-shaped with the face of the earbud being generally parallel to the longitudinal axis of the stem. The earpiece assembly may be pivoted from the use position to a storage position. The amount of pivoting is generally 90° or more, and preferably approximately 180°. In a first storage position, the earbud front face is generally normal to the stem longitudinal axis. In a second storage position where the earbud front face is generally parallel to the stem longitudinal axis. For storage, the earpiece assembly is preferably mated with the associated electronic device such that the stem is at least partially within a suitable recess in the casing of the electronic device. The ability of the earbud to pivot relative to the stem allows the earbud to assume a variety of configurations. In addition, the stem may include a microphone that is optionally operable even when the earpiece assembly is stored. In some embodiments, the portion of the stem adjacent the microphone is not surrounded by the recess, but instead is exposed, allowing the microphone to be readily used as the microphone for the electronic device. Thus, the pivoting earpiece assembly of the present invention may optionally include a microphone that can be readily utilized when the earpiece assembly is stored.

18 Claims, 4 Drawing Sheets

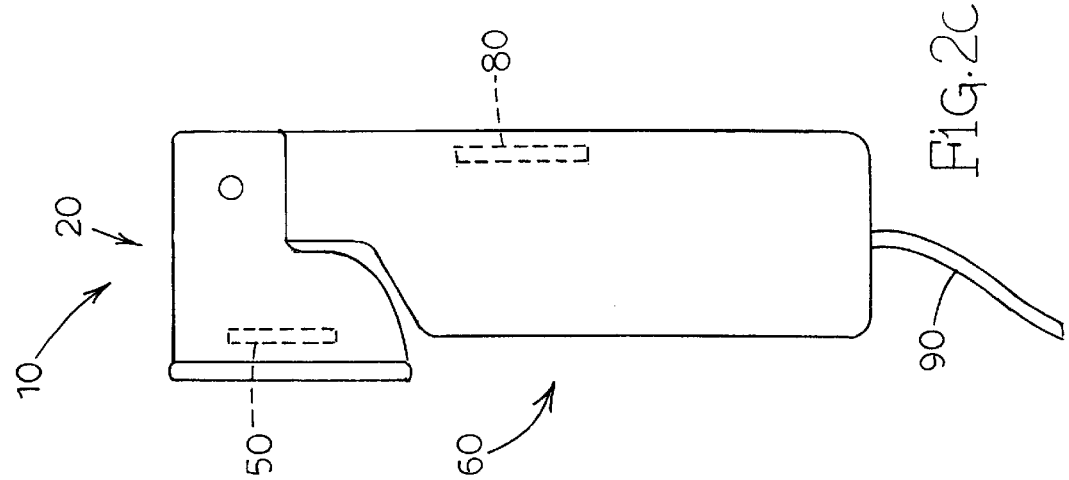
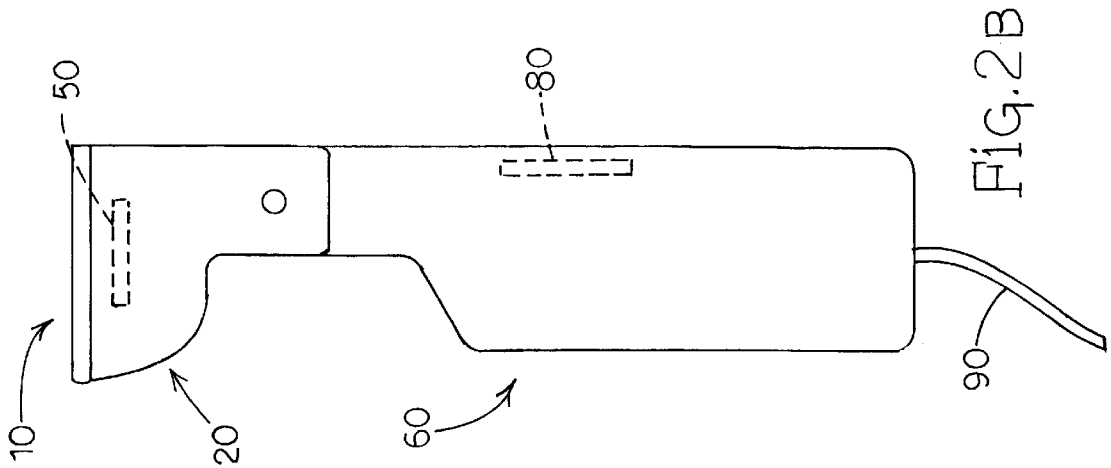
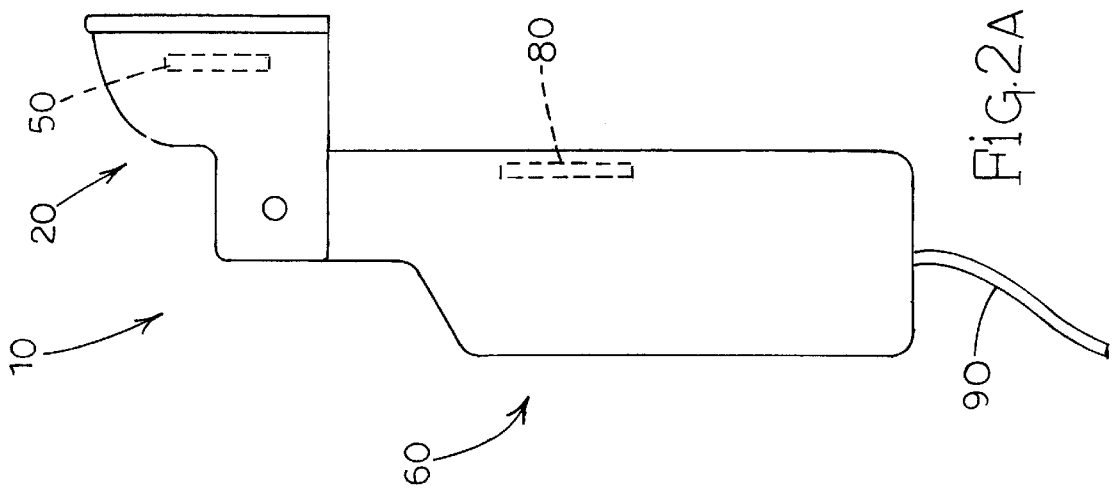

PIVOTABLE EARPIECE ASSEMBLY

FIELD OF THE INVENTION

The present invention relates to the field of earpieces and more particularly to a pivoting earpiece assembly.

BACKGROUND OF THE INVENTION

Users frequently listen to portable electronic devices, such as AM/FM radios, portable compact disc players, cellular telephones, and the like, through various small speaker devices collectively called "earpiece assemblies." A common characteristic of earpiece assemblies is that a portion of the earpiece assembly rests inside the user's ear when in use. That is, a portion of the earpiece assembly rests in, and is supported by, the pinna of the ear and typically abuts the external auditory meatus of the ear. Such earpiece assemblies have traditionally taken the form of small stereo headphone sets, single earbuds, and the like.

The portion of the earpiece assembly designed to rest inside the pinna is called an earbud and typically includes the speaker portion of the earpiece assembly. Typically attached to the earpiece is a downwardly extending stem. Typically, the earbud is integrally formed with the stem. Thus, there is a relatively fixed angle between the earbud and the stem for prior art earpiece assemblies.

Connecting the earpiece assembly with its associated electronic device is a flexible cord. The cord may be hardwired into the electronic device or may have a barrel plug or the like on its far end for plugging into a receptacle in the electronic device. Some electronic devices include an internal cord retractors which help neatly store the cord internal to the electronic device.

It is increasingly common for earpiece assemblies to also include microphones for picking up the voice of the user, typically mounted in the stem. While obviously not necessary for output-only electronic devices, such as AM/FM radios or compact disc players, such earpiece assembly microphones are popular options with other electronic devices such as cellular telephones, personal digital assistants, and the like.

The earbuds of traditional earpiece assemblies may not fit comfortably in many ears, principally because the associated stems prevent insertion of the earbud into a comfortable location. Further, it is common for traditional earpiece assemblies to be pulled out of the user's ear when the cord is inadvertently struck or snagged. Also, for those earpiece assemblies incorporating microphones, the microphones of the earpiece assembly are not available for convenient use when the earpiece assembly is stored.

Accordingly, there remains a need for a compact earpiece assembly which may have its physical configuration modified readily by the user. Further, such a compact earpiece assembly should, but is not required to, include a microphone which can be readily utilized when the earpiece assembly is in a stored condition.

SUMMARY OF THE INVENTION

The earpiece assembly of the present invention includes an earbud that is pivotably mounted to a stem. The pivotable connection allows the earpiece assembly to assume a variety of configurations, thereby overcoming some of the limitations of the prior art. In the use position, the earpiece assembly is preferably generally L-shaped with the face of the earbud being generally parallel to the longitudinal axis of the stem. The earpiece assembly may be pivoted from the use position to a storage position. The amount of pivoting is generally 90° or more, and preferably approximately 180°. In a first storage position, the earbud front face is generally normal to the stem longitudinal axis. Some embodiments may achieve a second storage position where the earbud front face is generally parallel to the stem longitudinal axis. For storage, the earpiece assembly is preferably mated with the associated electronic device such that the stem is at least partially within a suitable recess in the casing of the electronic device.

The ability of the earbud to pivot relative to the stem allows the earbud to assume a variety of configurations, thereby allowing the earbud to fit more comfortably in a variety of ears and the earpiece assembly to be made from more durable materials but still remain flexible enough for convenient use, and allowing greater flexibility in design for the layout of electronics.

In addition, the stem of the earpiece assembly may include a microphone that is optionally operable even when the earpiece assembly is stored. That is, when the stem is mated to the electronic device, the microphone is oriented such that the microphone may still be used. For instance, in some embodiments the casing of the electronic device may include a grill which allows sound to freely travel to the microphone. In other embodiments, the portion of the stem adjacent the microphone is not surrounded by the recess, but instead is exposed, allowing the microphone to be readily used as the microphone for the electronic device. Thus, the earpiece assembly of the present invention may optionally include a microphone that can be readily utilized when the earpiece assembly is stored.

BRIEF DESCRIPTION OF THE DRAWINGS

FIG. 2a is a side view of the earpiece assembly of FIG. 1 in the use position.

FIG. 2b is a side view of the earpiece assembly of FIG. 1 in one storage position.

FIG. 2c is a side view of the earpiece assembly of FIG. 1 in another storage position.

DETAILED DESCRIPTION

Figure 1:
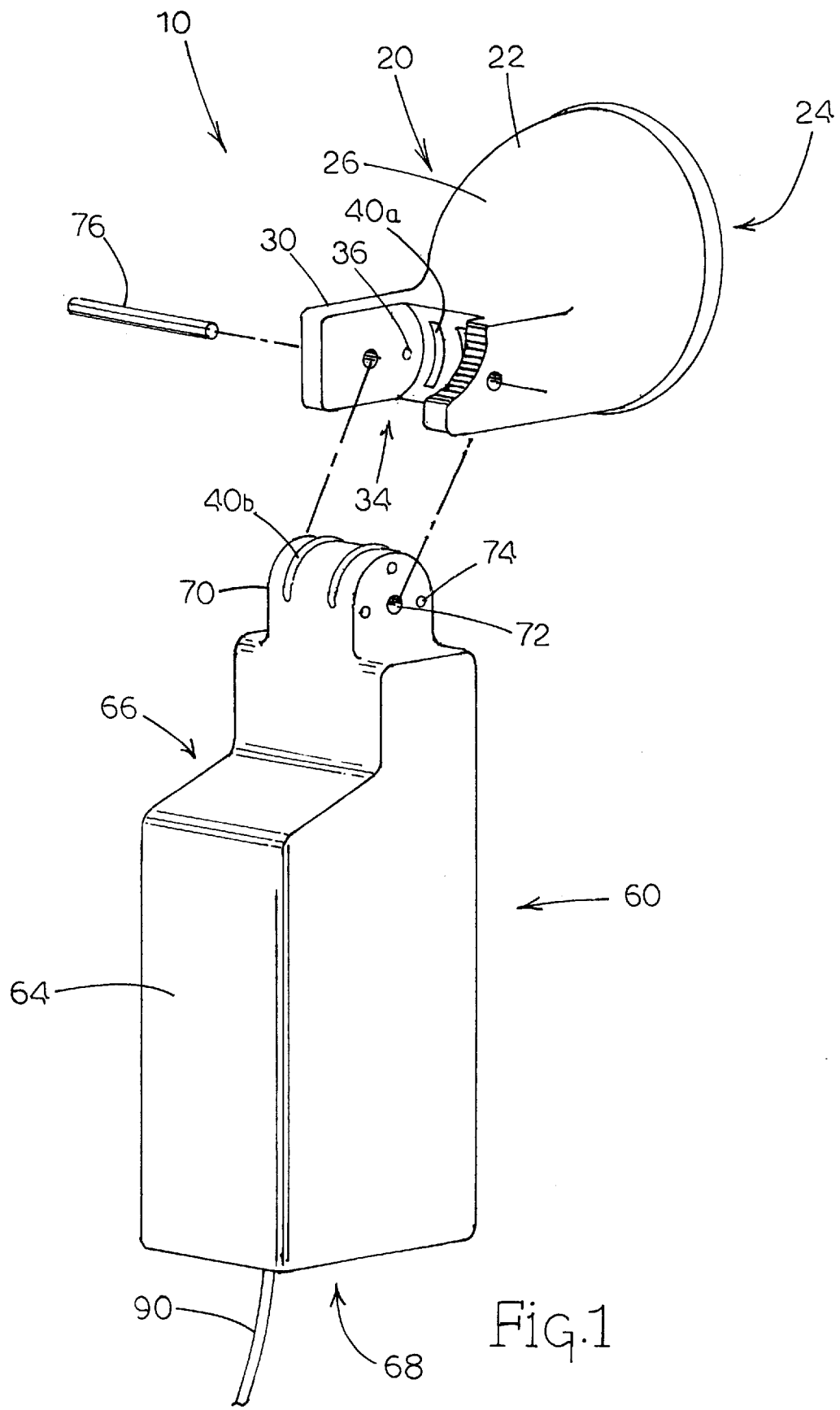
FIG. 1 is a partially exploded perspective view of an earpiece assembly according to the present invention.

The earpiece assemblies 10 of the present invention include an earbud 20 pivotally mounted to a stem 60. The earbud 20 includes a main body 22 typically having a generally flat front 24 and a generally hemispherical shaped rear 26. Internal to the main body 22 is a speaker 50. Extending rearwardly from the rear 26 are a pair of flanges 30, each having an having an axle hole 32 therethrough. The area between the flanges 30 defines a gap 34. The earbud 20 should be adapted for insertion into a human ear. As used herein, the phrase "insertion into a human ear" means that at least a portion rests in, and is directly supported by, the pinna and/or external auditory meatus of the human ear. Preferably, the earbud 20, when inserted in the ear, abuts the external auditory meatus of the ear.

The stem 60 is preferably generally parallelepiped shaped and has a hollow 66 on the back of its upper portion. The front 62 of the stem 60 is preferably generally flat, as is the lower portion of the rear 64. The bottom 68 of the stem 60 has a cord 90 extending therefrom. The upper portion of the stem 60 includes a pivot portion 70 of a width slightly less than the corresponding gap 34 between the flanges 30 of the of the earbud 20. Running transversely through the pivot portion 70 is a post channel 72.

The earbud 20 may be joined to the stem 60 by simply fitting the flanges 30 of the earbud 20 over the pivot portion 70 of the stem until the axle holes 32 line up with the post channel 72 and inserting a pivot rod 76 through the axle holes 32 and post channel 72. In addition, there should be some form of electrical connection between the cord 90 associated with the stem 60 and the speaker 50 of the earbud 20. For instance, the earbud 20 may include a plurality of metallic contacts 40a disposed between the flanges 30 and the stem 60 may include a plurality of corresponding contacts 40b disposed along the pivot portion 70 which are in communication with the cord 90. However, the electrical connection need not be of this form. Instead, a wide variety of alternative equivalent connection arrangements may be used, such as via a flexible cable, spring loaded contacts, optical couplers, or any other approach known in the art. The electrical connection between the cord 90 and the speaker 50 may be functional only when the earbud 20 is in selected position(s) or may functional across the entire range of possible earbud 20 positions.

For ease of description, the typical in-use position is shown in FIG. 2a. For simplicity, the earbud 20 is shown oriented normal to the longitudinal axis of the stem 60. However, it should be understood that the earbud 20 may be at some other angle with respect to the stem 60 while in use, such as slightly more or slightly less than normal to the stem 60. This in-use position defines a zero degrees of rotation reference relationship between the stem 60 and the earbud 20. When the earbud 20 is pivoted ninety degrees, the earbud 20 is oriented along the longitudinal axis of the stem 60 as shown in FIG. 2b. For some embodiments, the earbud 20 may be further pivoted an additional ninety degrees as shown in FIG. 2c.

Figure 3:
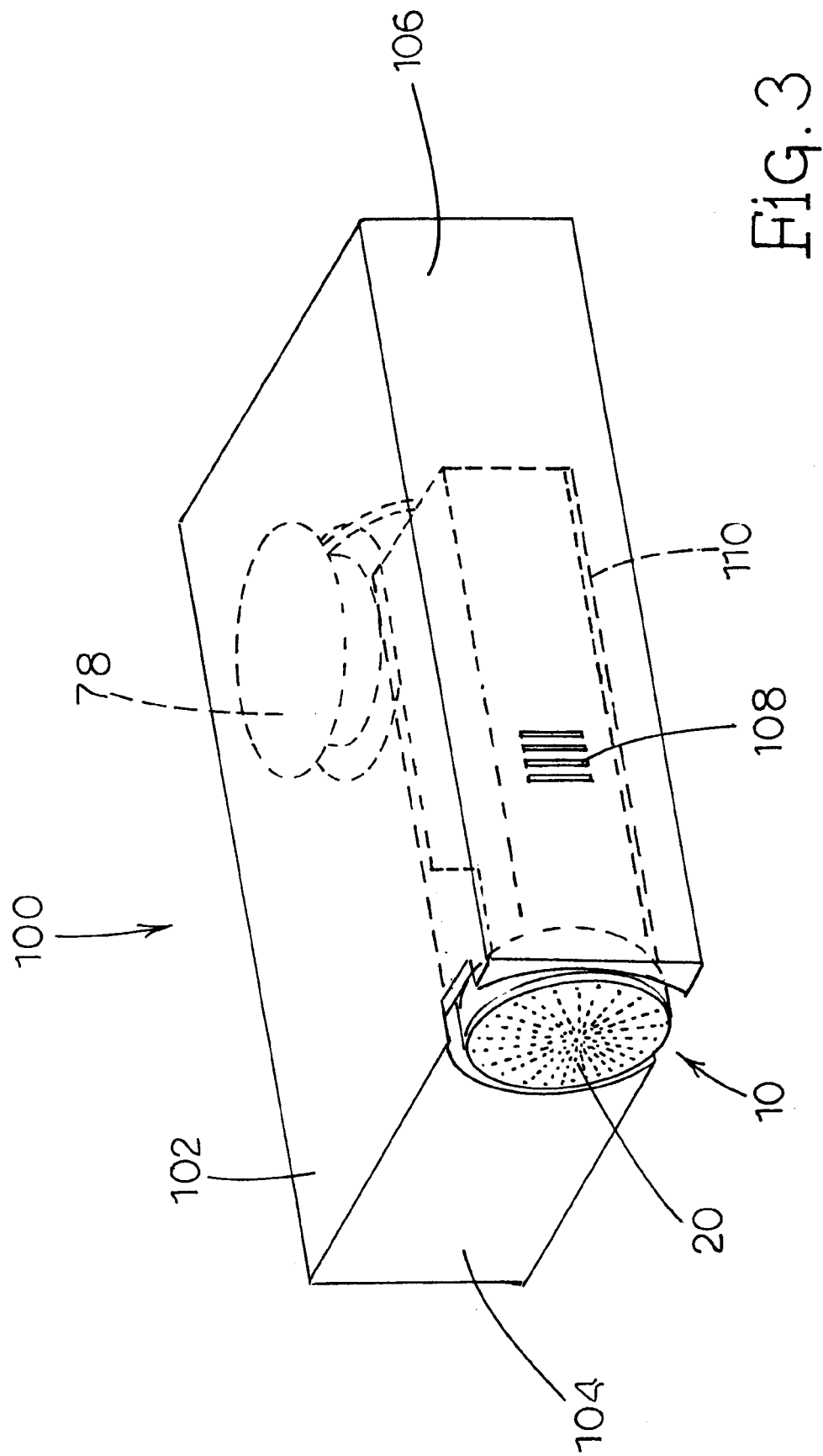
FIG. 3 is a perspective view of the earpiece assembly of FIG. 1 mated in one manner with one type of associated electronic device.
Figure 4:
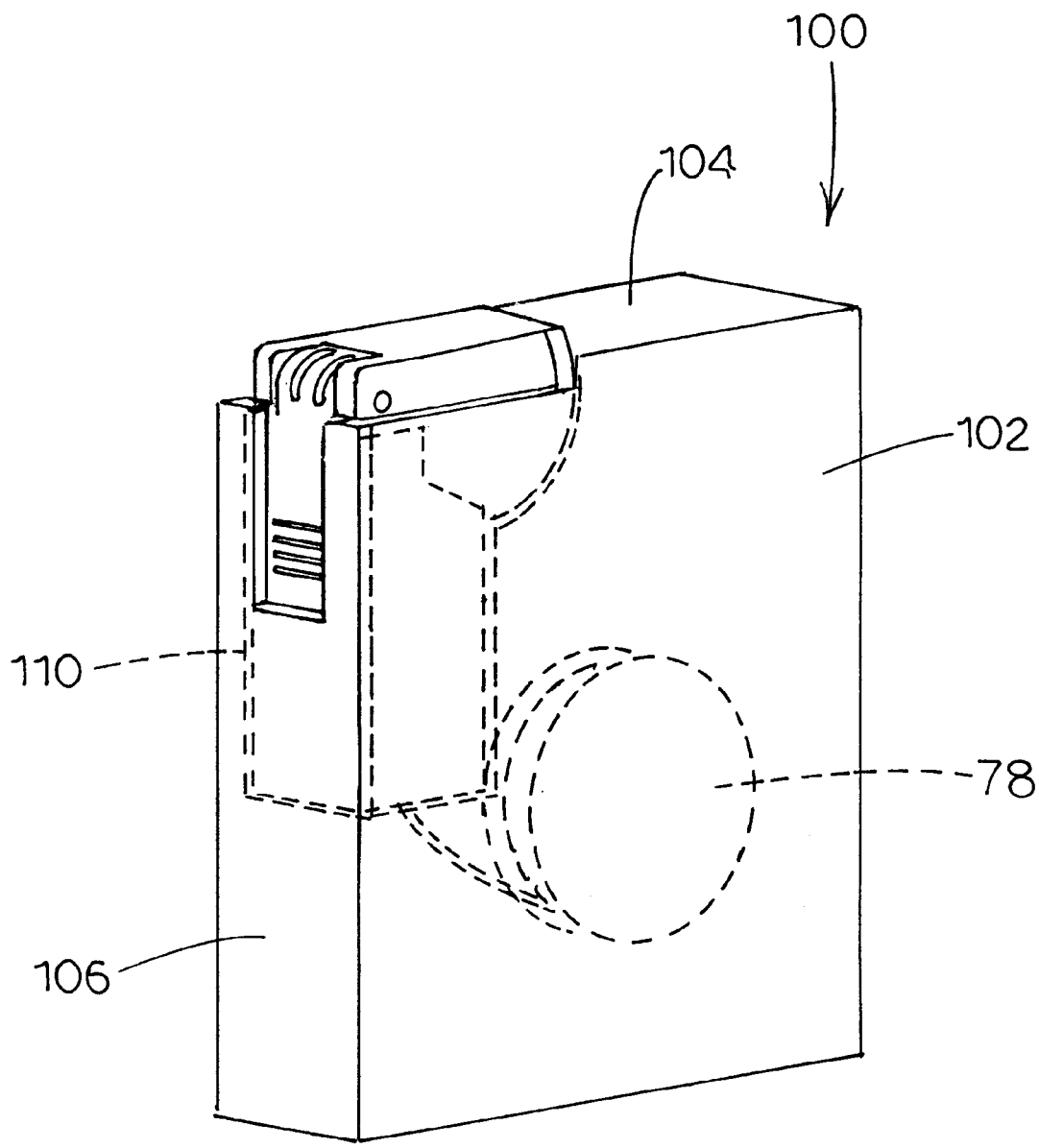
FIG. 4 is a perspective view of the earpiece assembly of FIG. 1 mated in another manner with an associated electronic device.

Associated with the earpiece assembly 10 is an electronic device 100 having an outer casing 102 surrounding various electronics. The particular function of the electronic device 100 is not important; the electronic device 100 need only generate audio sounds intended for a user when appropriate. Examples of the electronic device 100 include a common radio, a compact disc player, a cellular telephone, a personal computer, and the like. The casing 102 of the electronic device 100 includes a recess 110 for at least partially receiving the earpiece assembly 10 for storage. In some embodiments, the recess 110 runs from the bottom 104 of the casing 102 and up just inside the side 106 of the electronic device 100, such as shown in FIG. 3. In other embodiments, the recess 110 runs along the bottom 104 and side 106 of the electronic device 100, such as shown in FIG. 4. For all embodiments there is preferably a cord take-up means 78 residing inside the casing 102. Any of a wide variety of cord 90 take-up means 78 may be used, such as a wind-up wheel attached to a spring or a motor, or a similar means well known in the art. The cord 90 runs from the take-up means 78 to the stem 60 through the recess 110 and is taken up by the take-up means 78 internal to the electronic device 100.

The earbud 20 may be rotated from its use position (FIG. 2a) to a first storage position (FIG. 2b). In this first storage position, the earpiece assembly 10 may be stored at least partially inside the recess 110 of the casing 102 of the associated electronic device 100 so that the earbud 20 is oriented approximately directly away from the casing 102 of the electronic device 100. It is preferred that the earbud's 20 front face 24 be flush with the bottom 104 of the casing 102. An example of this approach is shown in FIG. 3. In addition to assuming a configuration suitable for storage at least partially within the casing 102 of the associated electronic device 100, the earpiece assembly 10 described above allows the front 24 of the earbud 20 to be facing outward when stored. Thus, the speaker 50 associated with the earpiece assembly 10 can be used as the speaker 50 for the electronic device 100 if so desired, even in the storage position.

Alternatively, the earbud 20 may be rotated to a second storage position (FIG. 2c). In this second storage position, the earbud 20 is rotated to an orientation (with respect to the stem 60) approximately opposite its orientation in the use position. It is preferred that the earbud 20 rest partially within the hollow 66 of the stem 60 in this second storage position. In this second storage position, the earpiece assembly 10 may be stored at least partially inside the recess 110 of the casing 102 of the associated electronic device 100, such that the front 24 of the earbud 20 does not face away from the casing 102 of the electronic device 100, but rather faces into a side wall of the recess 110 and is blocked in whole or in part by the casing 102. See FIG. 4.

The ability of the earbud 20 to pivot relative to the stem 60 is useful in three respects. First, the adjustability allows the earbud 20 to assume a variety of configurations, thereby allowing the earbud 20 to fit more comfortably in a variety of ears. Second, the pivoting allows the earpiece assembly to be made from more durable materials, such as hard plastics, but still remain flexible enough for convenient use. Third, the pivoting allows the earpiece assembly 10 to assume different configurations for storage, thereby allowing greater flexibility in design for the layout of electronics inside the electronic device 100.

Further, the stem 60 may optionally include a microphone 80 connected via the cord 90 to the electronics the electronic device 100. This microphone 80 may be of any type known in the art, including omnidirectional, directional, and vibratory. In the use position, the microphone 80 is typically pointed in the same general direction as the earbud 20 so as to be best oriented to pick up speech from the user. Further, it is preferred that the microphone 80 also be functional when the earpiece assembly 10 is in a stored condition. If the earpiece assembly 10 is stored as shown in FIG. 3, then the microphone 80 is typically internal to the side wall of the electronic device 100 casing 102. If it is desired to use this microphone 80 in such a storage position, then a microphone grill 108 may be placed in a suitable location along the side of the electronic device casing 102. If the storage position of FIG. 4 is used instead, then the microphone 80 is readily available for use without such an additional grill 108. Note that both approaches to storage should include a keying or other means to insure that the stem 60 is inserted into the electronic device casing 102 in the proper orientation.

The earpiece assemblies 10 described above have earbuds 20 that are relatively freely pivotable about the stem 60. However, it may be desirable to have the earbud 20 preferentially assume only a limited number of pivot positions. If so, then suitable detents, such as dimples 36 and dimple pockets 34, or other selective positioning means, may be employed to releasably retain the earbud 20 in preferred orientations with respect to the stem 60.

The present invention may, of course, be carried out in other specific ways than those herein set forth without departing from the spirit and essential characteristics of the invention. For instance, any alternative means of pivotally coupling the earbud 20 to the stem 60 may be employed, such as a living hinge, a ball and socket arrangement, or the like. Likewise, it is desirable, but not necessary for the speaker 50 to be in the earbud 20. Instead, the speaker 50 may be located in the stem 60, or in the electronic device 100, or elsewhere, and acoustically coupled to the earbud 20 via any means known in the art. The present embodiments are, therefore, to be considered in all respects as illustrative and not restrictive, and all changes coming within the meaning and equivalency range of the appended claims are intended to be embraced therein.

What is claimed is:

1. An earpiece assembly, comprising:
   an electronic device having an outer casing; said casing having a recess therein;
   an earpiece distinct from said casing and movable between a free position and a mated position, said earpiece comprising:
      a stem having a first end portion and a second end portion and a microphone;
      an earbud pivotably mounted to said first end portion and adapted for insertion into a human ear;
      a speaker acoustically associated with said earbud;
      said recess adapted to receive at least a portion of said stem;
      wherein said stem and said earbud are disposed outside said recess in said free position; and
      wherein said stem is disposed at least substantially within said recess and said microphone is operable in said mated position.

2. The earpiece assembly of claim 1 wherein said earbud includes said speaker.

3. The earpiece assembly of claim 1 further including a cord electrically connected to said speaker and mechanically connected to said second end portion of said stem.

4. The earpiece assembly of claim 1 wherein said earbud is moveable with respect to said stem between a use position and a storage position.

5. The earpiece assembly of claim 4 wherein said stem includes a longitudinal axis and said earbud includes a front face and wherein said earbud front face is generally normal to said stem longitudinal axis when said earbud is in said storage position.

6. The earpiece assembly of claim 4 wherein said stem includes a longitudinal axis and said earbud includes a front face and wherein said earbud front face is generally parallel to said stem longitudinal axis when said earbud is in said storage position.

7. The earpiece assembly of claim 3 further including a a retractor associated with said cord and disposed within said casing.

8. The earpiece assembly of claim 1 wherein said stem further includes a microphone portion adjacent to said microphone and wherein said microphone portion is exposed in said mated position.

9. The earpiece assembly of claim 1 wherein said earbud may be pivoted at least 180° relative to said stem.

10. The earpiece assembly of claim 1 wherein said earbud may be pivoted approximately 180° relative to said stem.

11. The earpiece assembly of claim 1 wherein said earbud may be pivoted at least 90° relative to said stem.

12. The earpiece assembly of claim 1 wherein said earbud may be pivoted approximately 90° relative to said stem.

13. The earpiece assembly of claim 1 wherein said earbud pivotably mounts to said stem first end portion via at least two flanges, each of said flanges including an axle hole, and wherein said earbud includes an axis running through the center of said axle holes, and wherein said earbud pivots about said axis.

14. An earpiece assembly, comprising:
   a) a stem having a first end portion, a second end portion, a longitudinal axis, and including a microphone;
   b) an earbud adapted for insertion into a human ear and having a front face, said earbud pivotably mounted to said first end portion and operable between a use position and a storage position, said earbud including a speaker;
   c) a cord electrically connected to said speaker and mechanically connected to said second end portion of said stem;
   d) a casing having a recess therein; said recess adapted to receive at least a portion of said stem;
   e) wherein said earpiece assembly is movable between a free position and a mated position, wherein said stem is disposed at least partially within said recess in said mated position and wherein said stem and said earbud are disposed outside said recess in said free position; and
   f) wherein, when said earpiece assembly is in said mated position,
      i) said earbud is in said storage position; and
      ii) said microphone is operable.

15. The earpiece assembly of claim 14 wherein said earbud front face is generally normal to said stem longitudinal axis when said earbud is in said storage position.

16. The earpiece assembly of claim 14 wherein said earbud front face is generally parallel to said stem longitudinal axis when said earbud is in said storage position.

17. The earpiece assembly of claim 14 wherein said stem further includes a microphone portion adjacent to said microphone and wherein said microphone portion is exposed in said mated position.

18. An earpiece assembly, comprising:
   a) a stem having a first end portion and a second end portion and a microphone;
   b) an earbud adapted for insertion into a human ear and having a front face and including a speaker;
   c) means for pivotably joining said earbud to said first end portion;
   d) said earbud operable between a use position and a storage position;
   e) a casing having a recess therein; said recess adapted to receive at least a portion of said stem;
   f) wherein said earpiece assembly is movable between a free position and a mated position, wherein said stem is disposed at least partially within said recess and said microphone is operable in said mated position and wherein said stem and said earbud are disposed outside said recess in said free position; and
   g) wherein said earbud is in said storage position when said earpiece assembly is in said mated position.

* * * * *